(12) United States Patent
Javadian et al.

(10) Patent No.: US 12,497,945 B2
(45) Date of Patent: Dec. 16, 2025

(54) DEVICE FOR REDUCING OSCILLATIONS IN A WIND TURBINE BLADE DURING STANDSTILL AND METHOD OF USING SAME

(71) Applicant: Vestas Wind Systems A/S, Aarhus N. (DK)

(72) Inventors: Payam Javadian, Aarhus N (DK); Balachandar Mahalingam, Coimbatore (IN)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 18/689,896

(22) PCT Filed: Sep. 8, 2022

(86) PCT No.: PCT/DK2022/050184
§ 371 (c)(1),
(2) Date: Mar. 7, 2024

(87) PCT Pub. No.: WO2023/036390
PCT Pub. Date: Mar. 16, 2023

(65) Prior Publication Data
US 2024/0369037 A1 Nov. 7, 2024

(30) Foreign Application Priority Data

Sep. 8, 2021 (DK) .......................... PA 2021 70447

(51) Int. Cl.
*F03D 1/06* (2006.01)
(52) U.S. Cl.
CPC ...... *F03D 1/06495* (2023.08); *F05B 2230/60* (2013.01); *F05B 2260/96* (2013.01)

(58) Field of Classification Search
CPC ...... F03D 1/06495; F03D 13/10; F03D 80/50; F05B 2230/60; F05B 2230/61; F05B 2260/96; F05B 2240/3062; Y02E 10/72
See application file for complete search history.

(56) References Cited

U.S. PATENT DOCUMENTS 3,942,693 A * 3/1976 Tocci ........................ A45C 1/04
224/222
4,294,238 A * 10/1981 Woodford ............. A61F 5/0111
482/79

(Continued)

FOREIGN PATENT DOCUMENTS

DE 102011111967 B3 1/2013
DK 201870065 A1 12/2018

(Continued)

OTHER PUBLICATIONS

Danish Patent and Trademark Office, technical examination issued in corresponding DK Application No. PA 20201 70447, dated Jan. 28, 2022.

(Continued)

*Primary Examiner* — Nathaniel E Wiehe
*Assistant Examiner* — Wayne A Lambert
(74) *Attorney, Agent, or Firm* — Wood Herron & Evans LLP

(57) ABSTRACT

A tool (14) for reducing vibrations in wind turbine blades at scheduled standstill for example during turbine installation or service, the tool comprising an elongate flow-disrupting flexible sleeve (15) for fitting over a blade tip and extending part-way along its length having a tip end which in use overlies a blade tip with a first edge which in use overlies a blade leading edge; and at the opposite edge a longitudinal (Continued)

slit, with tensioning bands (26) provided on the sleeve at opposite edges adjacent the slit for tensioning the sleeve in the longitudinal direction.

16 Claims, 3 Drawing Sheets

(56) References Cited

U.S. PATENT DOCUMENTS

| | | | | |
|---|---|---|---|---|
| 4,715,416 | A | * | 12/1987 | Horne ................ A63C 11/027 190/104 |
| 5,217,431 | A | * | 6/1993 | Toronto ............... A61F 5/0111 602/65 |
| 5,308,305 | A | * | 5/1994 | Romney ............ A63B 21/4021 482/121 |
| 5,522,592 | A | * | 6/1996 | Evelsizer, Jr. ......... A63B 60/64 206/315.6 |
| 5,634,213 | A | * | 6/1997 | Grover ............ A41D 19/01547 2/161.1 |
| 5,843,010 | A | * | 12/1998 | Bodmer ............... A61F 5/0111 602/5 |
| 6,142,967 | A | * | 11/2000 | Couch ................. A61F 13/067 602/66 |
| 8,033,791 | B1 | | 10/2011 | Watanabe |
| 8,595,931 | B2 | | 12/2013 | Riddell et al. |
| 9,795,499 | B2 | * | 10/2017 | Ponce ................. A61F 5/0127 |
| 12,098,698 | B2 | * | 9/2024 | Danielsen .............. F03D 80/00 |
| 2004/0116260 | A1 | * | 6/2004 | Drennan ............ A63B 21/0552 482/131 |
| 2010/0139062 | A1 | * | 6/2010 | Reed ...................... F03D 13/10 29/889.1 |
| 2012/0301293 | A1 | * | 11/2012 | Bech ...................... F03D 13/10 416/1 |
| 2015/0366720 | A1 | * | 12/2015 | Hitschmann .......... A61F 13/085 602/62 |
| 2016/0327019 | A1 | | 11/2016 | Tobin et al. |
| 2017/0002797 | A1 | * | 1/2017 | Chen .................... F03D 7/0296 |
| 2017/0101979 | A1 | | 4/2017 | Tobin et al. |
| 2017/0143527 | A1 | * | 5/2017 | Paulos ............ A63B 21/00069 |
| 2017/0370386 | A1 | | 12/2017 | Wardropper et al. |
| 2018/0266388 | A1 | * | 9/2018 | Hallissy ................. F03D 80/30 |
| 2023/0383732 | A1 | * | 11/2023 | De Ruiter ............... F03D 80/50 |

FOREIGN PATENT DOCUMENTS

| | | | | |
|---|---|---|---|---|
| EP | 3112667 | A1 | | 1/2017 |
| GB | 2475865 | A | | 6/2011 |
| WO | WO-2013091655 | A1 | * | 6/2013 ............ B66C 1/108 |
| WO | WO-2017044829 | A1 | * | 3/2017 ........... A61F 5/0104 |

OTHER PUBLICATIONS

International Searching Authority, International Search Report and Written Opinion issued in corresponding PCT Application No. PCT/DK2022/050184, dated Nov. 18, 2022.

\* cited by examiner

DEVICE FOR REDUCING OSCILLATIONS IN A WIND TURBINE BLADE DURING STANDSTILL AND METHOD OF USING SAME

This invention relates to an anti-oscillation tool for wind turbine blades and to a method for securing wind turbine blades against oscillations.

During the construction of a wind farm the wind turbines in the farm are progressively installed, and there is typically a period of time where the turbines are assembled, but the turbines are not yet operational. In addition to construction of the turbines various other works are required including the construction and installation of the electrical systems and components required to connect to the grid, including internal park connections, substations and switches etc. Individual turbines will be erected and even if structurally complete will typically sit at standstill for a period before being fully commissioned and connected to the grid. During this period the rotor is locked and the blades are to as great an extent as possible positioned to minimise the forces experienced from the incident wind. However, the wind direction will inevitably change and without the possibility to adjust the yaw and/or pitch, the blades may be subject to incident wind which risks setting up unwanted vibrations.

The problem of such oscillations is caused by the largely unstable flow of air around the blade when the blade is pitched out of the wind. The air flows around the curved surface of the blade, but cannot stay attached to the blade surface in laminar flow because the blade is not pitched correctly to support lift. At high angles of attack stall is observed, with associated negative aerodynamic damping, resulting in instability of flow which can give rise to blade oscillations.

These oscillations are typically experienced first at the tip of the blade, where the reduced diameter and lighter frame offer less resistance to the rhythmic shifting force provided by the air. The worst case is when the incident wind meets the blade perpendicular to one of its flat surfaces and has to flow around the leading and trailing edge of the blade. In this situation the vortices can be shed in a manner which creates significant vibration, particularly if resonance phenomena are exhibited, and in rare situations even to the extent that blade damage can result.

Wind turbines are also necessarily at standstill during service or repair of the turbine or its blades, and during such periods of service the blades may also be susceptible to edgewise vibration.

The Applicant has previously disclosed in EP2507513 the use of a tool for fitting over blades at standstill in the form of a sleeve-like device formed of a net-like material having an open mesh. The mesh material of the sleeve is able to disrupt the smooth flow of air over the blade by forming a turbulence-inducing non-aerodynamic surface which thereby significantly reduces the instability associated with stall generation.

In order to provide improved aerodynamic properties, blades are commonly fitted with structures which change the airflow over the blade. For example, blades may be provided with serrated structures at the blade trailing edge which serve to reduce turbulence and hence reduce noise, and increase aerodynamic lift. These are typically formed of plastics strips which are mounted on or integrated into the blade at the blade trailing edge. These structures are relatively delicate, and can be damaged by the sleeve-like tools of the type discussed above, particularly during installation and removal of the tools. Moreover, the tools themselves can be damaged by the serrations, again particularly during installation or removal, or when fitted, especially during periods of high wind.

The present invention is a development of this tool which is effective at reducing such vibrations, whilst being easy to install and remove from a blade, and which minimises risk of damage to the blade and any aerodynamic-enhancing features provided on the blade or to the tool itself.

SUMMARY OF THE INVENTION

In a first aspect the invention resides in a device for fitting to wind turbine blades at turbine standstill in a non-operational mode for example during turbine installation or service.

The device comprises an elongate flow-disrupting flexible sleeve for fitting over a blade tip and extending part-way along its length having a tip end which in use overlies a blade tip, and an open end, and a first edge region which in use overlies a blade leading edge, wherein the sleeve defines a longitudinal slit at an edge opposite the first edge region, and wherein tensioning bands are provided on the sleeve at opposite edges adjacent the slit for tensioning the sleeve in the longitudinal direction.

The provision of the tensioning bands allows a high degree of tension to be applied to the sleeve at the sleeve edges adjacent the slit, even where the material of the sleeve may not be capable of taking such tension. In this manner, the sleeve can be tightly held against the blade at the trailing edge, and reliably held in position on the blade, even during sustained periods of use in high winds.

The bands may comprise elastic material, such as an elastomer. This allows a high tension to be applied and maintained, in that even if a degree of loosening occurs at the point of securing, the elasticity ensures tension is maintained. The material of the sleeve may be secured to the bands for example by stitching or adhesive, or the bands may be integrated into the sleeve material or over the sleeve material.

In an alternative form the tensioning bands may comprise an inelastic flexible material such as high strength webbing or tape, such as is used in lifting applications, to which a high degree of tension can be applied.

It may also be the case that additional tensioning bands are provided extending laterally across the sleeve, which advantageously are also extensible. A number of such additional bands may be provided spaced apart down the sleeve length. These preferably extend across the full width of the sleeve from the sleeve edge adjacent the slit to the sleeve leading edge. These lateral bands are arranged so that in the un-tensioned sleeve they adopt a configuration in which the they are somewhat bunched and do not extend across the full width extent of the blade. As the sleeve is longitudinally tensioned these additional bands will also become tensioned, thereby holding the sleeve tightly against the blade surface across a major part of the width of the sleeve.

The sleeve is tensioned by means of tensioning lines secured between a fixed point or points on the blade or rotor hub and the sleeve, notably to the ends of the longitudinal tensioning bands at the sleeve open end closest to the blade root. More particularly, in order to facilitate effective tensioning a fixing device in the form of a rigid strip or hoop may be provided which in use extends around the blade at a position between sleeve and blade root, to which the tensioning lines are secured. This fixing device is itself tied to a fixed point on the blade or hub. It then forms an anchor whereby tensioning of the sleeve can be effected at several circumferential positions, including at least the longitudinal tensioning bands, and preferably at one or more positions distant from these bands such as at the leading edge. Tensioning lines or straps may be used which include ratchet arrangements, to allow a high degree of tension to be provided manually.

The flexible sleeve is preferably formed of a material which provides a high surface roughness when fitted on a blade, such as of a net-like material.

Alternatively, the flexible sleeve is formed of a fabric bag with a plurality of flow-disrupting members protruding from and secured to the bag distributed spaced over the bag.

In further aspects the invention resides in a wind turbine blade having a flow disrupting device as defined above fitted thereon, and in a wind turbine having blades with such devices fitted on each of the blades.

In a further aspect the invention resides in a method of fitting a device as defined above on a wind turbine blade, comprising the steps of: positioning the sleeve of the device over the blade with the device tip fitting over the blade tip and the sleeve extending over and along the blade with the slit arranged at the blade trailing edge, and applying tension to the tensioning bands so that the sleeve is tightly held against the blade surface at the region of the trailing edge.

Where the sleeve of the device is provided with lateral tensioning bands, the method further comprises the step of, as the sleeve is longitudinally tensioned, allowing the lateral bands to become tensioned, thereby holding the sleeve tightly against the blade surface.

In a still further aspect the invention resides in a method of operating a wind turbine to inhibit oscillations induced by the air flow across the blades when the wind turbine is a non-operational mode using the device as defined above, the method comprising: releasably locking the wind turbine rotor; for each rotor blade fitting a device over the blade as defined above, and tensioning onto the blade, so that the device covers a region of the blade surface and provides a non-aerodynamic outer surface for inducing turbulence in the air flow across the blade.

BRIEF DESCRIPTION OF THE DRAWINGS

Embodiments of the invention will now be described in more detail, and by way of example, with reference to the following drawings, in which.

DETAILED DESCRIPTION OF THE PREFERRED EMBODIMENTS

Figure 1:
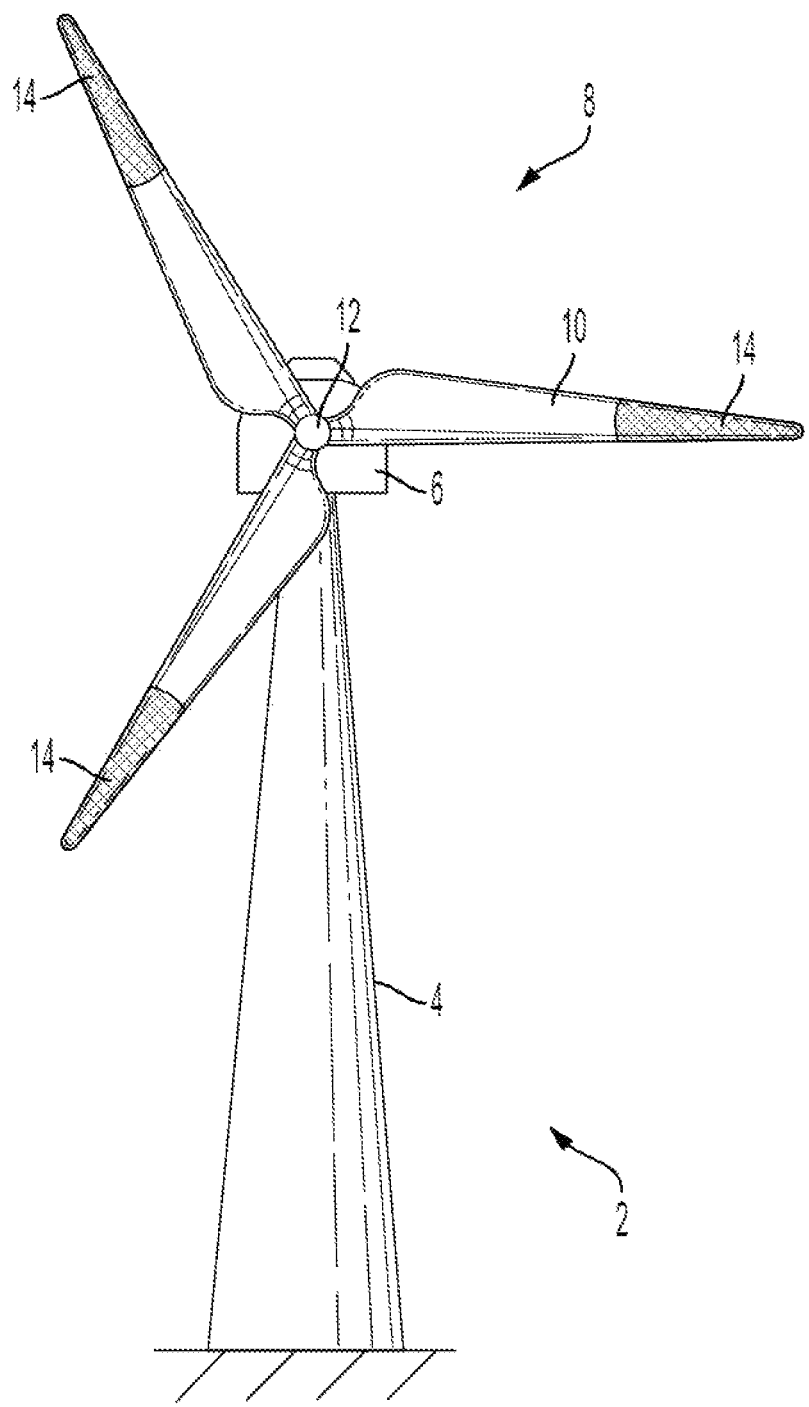
FIG. 1 is a schematic illustration of a wind turbine, including an anti-oscillation tool fitted to the wind turbine blades.

A typical horizontal axis wind turbine is illustrated in FIG. 1 to which reference should now be made. FIG. 1 illustrates a wind turbine 2, comprising a wind turbine tower 4 on which a wind turbine nacelle 6 is mounted. A wind turbine rotor 8 comprising a number of wind turbine blades 10 (usually three, sometimes two) is mounted on a rotor hub 12.

The hub 12 is supported on a shaft (not shown) extending from the nacelle front. The nacelle and rotor can be turned about a vertical axis, using a yaw drive positioned at the top of the tower 4, to change the direction in which the turbine faces. The blades 10 are aerodynamically profiled so that they experience a 'lift' or pressure from the wind as the wind flows over the surface of the blade. The angle or pitch at which the leading surface of the blade aerodynamic profile meets the incident wind can in operation be altered using a pitch drive that rotates the blades 10 with respect to the hub 12.

In normal power generation, the yaw drive turns the nacelle 6 so that the rotor 8 of the wind turbine is pointed into the wind. The pitch of the blades 10 can then be adjusted so that the force they experience from the wind is maintained within safe operating parameters, while generating as much energy from the incident wind as possible.

As discussed above, there are situations in which a wind turbine is at standstill in a non-operational mode, and is unable to respond to changes in wind direction. During construction of a wind farm as turbines are progressively erected they are necessarily at standstill with the rotors locked and unable to operate for a period, until connection to the grid and full commissioning can occur. In the case of large wind farms with many turbines this period can be several months. Moreover, during subsequent service or repair of the turbine or its blades, the rotor can be at standstill for a period of time, with the rotor locked and unable to be adjusted in response to wind direction changes. As noted, it is during such periods of rotor standstill without ability to yaw the turbine and/or to pitch the blades that the blades can occasionally be susceptible to edgewise vibration.

FIG. 1 shows schematically the location of an anti-oscillation tool 14 fitted to each of the blades 10 at the blade tip region and extending part way along the blade. The tool serves to alter the aerodynamic properties of the blades to reduce risk of such vibrations.

Figure 2:
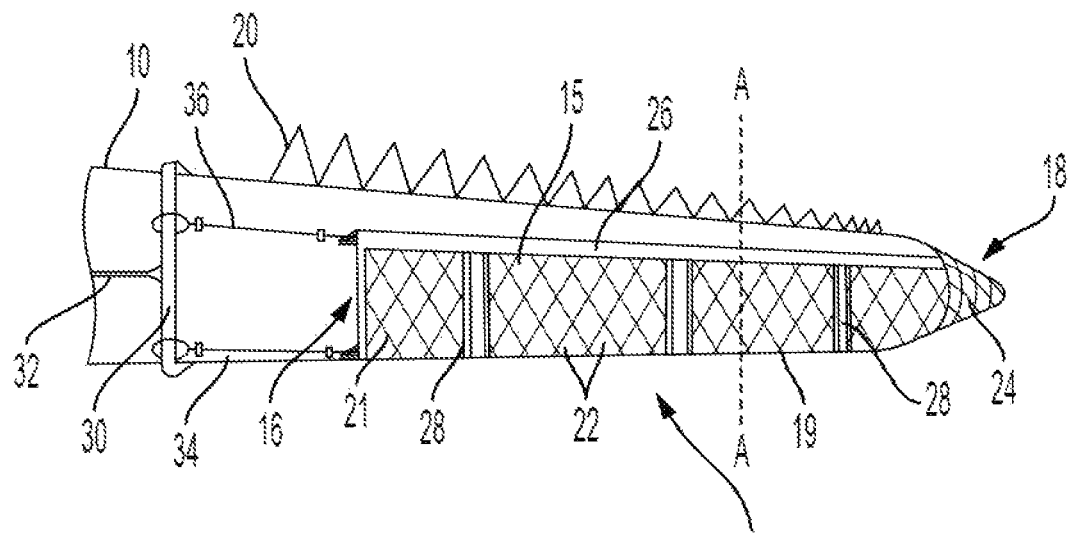
FIG. 2 is a plan view of a first embodiment of an anti-oscillation tool fitted to a wind turbine blade.

FIG. 2 shows an anti-oscillation tool 14 in accordance with a first embodiment of the invention, which is an elongate flexible sleeve 15 that is fitted over the tip of a wind turbine blade 10 when the rotor is locked and at standstill.

The sleeve 15 has an open end 16 which is manoeuvred over the blade tip on installation of the tool and which in use lies closer to the blade root, and a closed or substantially closed tip end 18 which in use overlies the blade tip extremity. A leading edge region 19 in use overlies the blade leading edge, and opposed sides 21, 23 (FIG. 3) in use overlie the blade on pressure and suction sides. As is discussed further below, the sleeve is essentially open-sided along one edge with a longitudinally extending opening or slit extending from the open end 16 almost to the tip 18 of tool.

The tip region of the blade is the region most susceptible to oscillation, and as such the tool 14 is dimensioned to extend at least over the blade tip region and extend along the blade length by several metres from the tip end. For a typical blade of say 50-80 m in length, the length of the tool 14 can be anywhere in the range of a few meters to a few tens of meters. For a blade of about 50-80 m it is found that a length of about 10 m is preferred; whilst the technical benefit increases with a longer tool the additional benefit is limited and must be weighed against the practical considerations of handling a larger and heavier tool.

As can be seen in FIG. 2 the blade here is provided with aerodynamics-enhancing features in the form of trailing edge serrations 20 (indicated not to scale in the Figure). However, the tool can equally be employed in connection with blades which do not have such features. The plan form of the sleeve 15 matches at least approximately the form of the blade region to which it is to be fitted so that it covers a major part of the blade width, and is therefore relatively wide in the chordwise direction at the open end 16, and tapers towards the tip 18. Moreover, to conform to the thickness of the blade the sleeve needs to accommodate only the relatively thin blade regions at its tip 18, but broadens towards its open end 16 closer to the blade root.

The sleeve 15 is formed of a net-like material comprising a large number of intersecting or overlapping individual cords 22, where the cords may themselves comprise individual fibres or twisted strands. The cords are arranged to form a relatively open mesh. For example, as illustrated schematically in FIG. 2, the cords comprise elements forming an inclined cross-pattern of intersecting cords. In reality, a larger number of chords will form the net than are illustrated. It will further be appreciated however that a variety of other patterns of fibres or strands can be utilised in the constitution of the net.

The individual cords of the net may have a diameter of from 1-2 mm up to 20 mm diameter, most preferably about 4 mm. The weave or mesh size of the net may have a wide range, for example from 10 mm to 100 mm. The fibres of the cord may be natural fibres such as hemp, sisal, jute or cotton, or synthetic fibres such as nylon, polyamide, polypropylene, polyethylene, or any suitable thermoplastic fibrous material. The net-like material with multiple cords crossing the blade in different directions serves to present a coarse surface which disrupts the smooth flow of air over the blade surface, creating turbulence and thereby reducing vortex shedding from the blade edges.

At the tip region 18 the net of the tool may have additional reinforcing features such as additional stitching or reinforcing fabric 24 to receive the blade tip and facilitate the longitudinal tensioning of the tool, as is now described.

Figure 3:
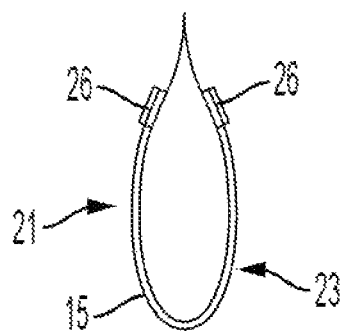
FIG. 3 is a schematic sectional view along line A-A of FIG. 2.

At the edges of the tool which are closest to the blade trailing edge and which define the open side or opening, the material of the sleeve is provided with a tensioning band 26 by which the tool can be longitudinally tensioned, to ensure its retention on the blade. Thus, there are two bands 26 extending on opposite sides of the blade trailing edge as can be seen in FIG. 3. The tensioning bands 26 comprises a strip of extensible or elasticated material to which the net material of the sleeve is secured along the tool length. In one form these comprise strips of about 5 to 10 cm width of rubber or other elastomeric material. The band may constitute a seam of the net to which the net material is secured. The use of such elastic material allows a significant longitudinal tension to be applied and to be maintained, thereby keeping the free edges of the sleeve at the trailing edge tightly against the blade. The tip reinforcement 24 ensures that the relatively sharp blade tip does not damage the tool end.

Alternatively, an inelastic material may be employed for the tensioning bands, such as a high strength webbing or tape, for example of the type typically employed in lifting apparatus. Means for applying a significant tension such as a ratchet arrangement are then desirable.

In addition to the longitudinal tensioning arrangement, the tool is provided with a number of lateral tensioning features in the form of a number of spaced bands 28. These are also preferably formed of extensible material, configured so that as the tool is put in place on the blade and longitudinally tensioned in position the bands extend from a bunched configuration to become extended into the fitted position in FIG. 2 and provide lateral tensioning, so that the sleeve is held tightly onto the blade surface across the width of the tool.

As noted above the sleeve has a longitudinally extending side opening or slit extending from the open end of the tool 16 nearest to the blade root to a position close to the tool tip 18. This opening accommodates the blade trailing edge and blade serrations 20 so that the tool does not overlie and interfere with the serrations. The exact longitudinal extent of the opening may correspond with the location of the blade serrations, such that the if these are not located along the entire blade length the opening can likewise be shortened.

Figure 4:
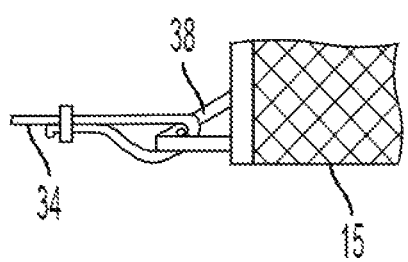
FIG. 4 shows a detail of a fixing point on the device.

In order to facilitate correct location and tensioning the tool is provided with a hoop 30 which in use surrounds the blade at a position towards the root of the blade and at a position on the blade which is devoid of blade serrations 20, being located towards the root side of the serrations. The hoop 30 comprises a ring of rigid material such as a metal band, preferably provided with a soft inner surface so that it does not damage the blade surface when fitted. This hoop 30 is itself secured to the blade root or blade hub by a fixing line or strap 32. The hoop 30 provides anchor points for the sleeve tensioning arrangement. As shown in FIGS. 2 and 3 there are provided a leading edge tensioning line 34 extending between hoop 30 and a sleeve at or near its leading edge region, and a pair of trailing edge tensioning lines 36 at the position of the two trailing edge tensioning bands 26. FIG. 4 shows a detail of the connection between edge of the sleeve at the root end closest to the blade root, and a tensioning line 34 or 36, where a wire or rope loop 38 is fixed at the sleeve end 16.

Figure 5:
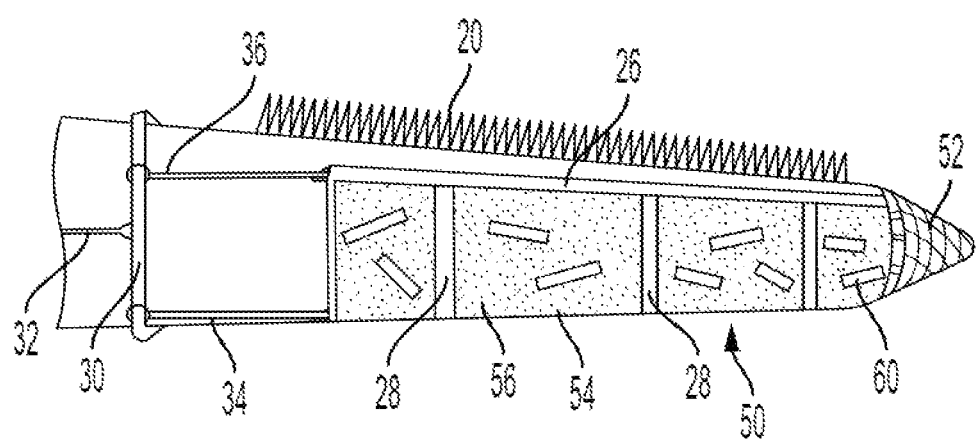
FIG. 5 is a plan view of a second embodiment of an anti-oscillation tool fitted to a wind turbine blade.

A second embodiment of the invention is described with respect to FIG. 5. Here the tool has similar configuration and construction, with like parts having like reference numerals, but differs in the material and construction of the sleeve. In this version the tool has a sleeve 50 formed of an elongate open-sided bag or cover of textile fabric material or thin flexible sheet material such as a plastics material.

As with the first embodiment, the bag or cover making up the sleeve 50 is shaped and dimensioned to make a close fit over the blade tip region covering a major proportion of the blade surfaces at the tip region, and likewise extending several metres or tens of metres along the blade length. It has a tip 52 which when fitted overlies the blade tip extremity, a leading edge region 54 which in use overlies the blade leading edge, and opposed side faces 56 (one side face shown) which in use overlie the blade on pressure and suction sides (similar to that shown in FIG. 3). At the tip 52 the bag is provided with reinforcing structures in the form of additional material and/or stitching, for example a material double layer or a layer of tape or webbing to allow the tip 52 to receive the significant longitudinal tension which is applied in use.

The material making up the bag may be a woven synthetic plastics material. Ideally, the material is at least breathable and preferably able to allow water to pass through to a degree to prevent trapping water therein. Particularly suitable materials include nylon, PVC, polyester, polyurethane, polyethylene or polypropylene. Other material such as cotton canvas might also be used. As an alternative to a woven material, the material of the bag may be a thin plastics sheet material. The weight of the material is selected so that the bag is able to withstand being subjected to high winds without tearing. Such materials may be coated to reduce friction with the blade to further facilitate fitting on and removal, for example with silicone or Teflon on other low friction material. Oils may also be employed for this purpose. Appropriate selection of material can also further facilitate bag removal in adverse weather conditions such as when the bag is wet or even frozen.

As with the first embodiment, at the edges of the tool which are closest to the blade trailing edge and which define the open side or opening, the material of the sleeve is provided with a tensioning band 26 by which the tool can be longitudinally tensioned, to ensure its retention on the blade. Thus, there are two bands 26 extending on opposite sides of the blade trailing edge. The tensioning bands 26 comprises a strip of extensible or elasticated material to which the fabric material of the sleeve is secured along the tool length. In one form these comprise strips of about 5 to 10 cm width of rubber or other elastomeric material. The band may constitute a seam of the bag to which the bag material is secured. The use of such elastic material allows a significant longitudinal tension to be applied and to be maintained, thereby keeping the free edges of the sleeve at the trailing edge tightly against the blade. The tip reinforcement 52 ensures that the relatively sharp blade tip does not damage the tool end.

Alternatively, an inelastic material may be employed for the tensioning bands, such as a high strength webbing or tape, for example of the type typically employed in lifting apparatus. Means for applying a significant tension such as a ratchet arrangement are then desirable.

In addition to the longitudinal tensioning arrangement, the tool is provided with a number of lateral tensioning features in the form of a number of spaced bands 28. These are also preferably formed of extensible material, configured so that as the tool is put in place on the blade and longitudinally tensioned in position the bands extend from a bunched configuration to become extended into the fitted position in FIG. 5 and provide lateral tensioning, so that the sleeve 50 is held tightly onto the blade surface across the width of the tool.

The bag is provided with a number of flow-disrupting members 60 protruding from and secured to the bag. The flow-disrupting members 60 are of generally elongate form of greater length than their width or height. The members 60 upstand from the bag by at least several centimetres, for example between 2 and 10 cm, or more preferably about 3 to 5 cm. The members 60 are arranged so that they form turbulence-inducing barriers to airflow extending generally chordwise across the blade which could otherwise create a degree of aerodynamic lift and risk of undesirable oscillations. Since in practice the airflow which might cause undesirable oscillations may arise at a variety of angles relative to the strict chordwise direction, the members 60 are arranged so that the lengths of different members extend at a variety or multiplicity of different angles relative to the bag (and hence blade) axis. It is preferred that at least the majority of the members 60 extend at an angle of less than about 45 degrees to the blade axis, but otherwise exhibit a generally random pattern of orientation, so as to present significant length generally perpendicular and therefore obstructive to chordwise airflow. Both sides 56 of the bag are advantageously fitted with the flow-disrupting members 60, that is sides of the bag which overlie both windward and leeward blade surfaces. However, in some cases it may be possible to employ such flow-disrupting members 60 on only one side of the bag, for example where the risk of potentially-damaging incident wind on one blade face is less.

The individual flow-disrupting members 60 may have a variety of lengths for example from 0.5 to 1.5 m, more preferably about 0.7 m The flow-obstructing members 60 comprise bodies of a relatively light material and/or construction so as to protrude from the surface of the bag without adding too significant weight to the tool. In one preferred form these bodies comprise plastics foam blocks which are constrained in pockets of material joined by stitching or other means to the material of the bag. The blocks here have a square or rectangular section but may have a variety of other forms, for example circular or polyhedral. As an alternative to plastics or foam, sections of hollow plastics materials may be used, for example extrusions of square or rectangular section. It will however be appreciated that a wide variety of other materials (e.g. other plastics materials, balsa wood) or structures may be employed to provide the upstanding bodies, subject to the requirement that they should be relatively rigid and light.

The illustrated bodies are straight sections for ease of fabrication, but this is not essential and a variety of other shapes may be employed, for example zig-zags, curved shapes, or 'S' shapes, provided that the bodies have regions which form obstructions to generally chordwise airflow. A curved design is able to present a plurality of different angles to the chordwise direction in the one body.

When employed during turbine erection, the tool of either above-described embodiment is typically fitted on the blade in the field before the blade 10 is lifted and installed on the turbine hub 12. Alternatively, the blade 10 can be installed on the hub 12, and the tool later fitted. Further alternatively, the tool may be fitted to the blade 10 at the blade factory or other location prior to its transport to the wind farm site. When used during a blade or turbine service operation the tool can be fitted to the already-installed blade 10, preferably whilst the blade is in the downward-pointing six o'clock position, for example by service personnel using rope access or drone access.

On installation the tool is brought towards the tip of the blade with the sleeve open end adjacent the blade tip. The hoop 30 is first positioned over the blade tip and pulled upwards over the blade, taking care not to interfere with the serrations, and secured by the tensioning line 32 which extends from the blade root or hub. Either at the same time as the hoop is being positioned or subsequent to this, the sleeve is positioned over the blade, either pulling it longitudinally along the blade length until the blade tip is received in the tip 24 or 52 of the tool or pulling it laterally onto the blade via the open side of the sleeve, by maneuvering the tool tip over the blade tip and pulling the tool laterally until the leading edge of the tool is positioned over the blade leading edge. Once generally positioned, tension is applied to the lines 34 and 36 whereby the bands 26 and 28 are brought into tension and the sleeve is thereby correctly positioned and tightly held against the blade surface. The tensioning lines 34,36 are then secured by knots or cleats or other fixtures.

The tool, once in place on wind turbine blades 10, limits vortex shedding induced oscillation of the wind turbine blade, by deliberately causing turbulent air flow and randomizing the attachment/vortex shedding effect, reducing the oscillations and the possibility of blade damage.

The invention claimed is:

1. A device for fitting to a wind turbine blade during turbine standstill to reduce risk of blade oscillation, comprising:
    an elongate flow-disrupting flexible sleeve for fitting over a blade tip and extending part-way along a length of the wind turbine blade, the sleeve defining a longitudinal direction and a lateral direction, the sleeve comprising:
    a tip end which in use overlies the blade tip,
    an open end spaced from the tip end in the longitudinal direction, a first region extending in the longitudinal direction and which in use overlies a blade leading edge, a slit opposite the first region and extending in the longitudinal direction, the slit defining a first slit edge and a second slit edge spaced from the first slit edge in the lateral direction to define an opening through the sleeve from an outer surface of the sleeve to an inner surface of the sleeve, wherein in use the first slit edge is on one lateral side of a blade trailing edge, the second slit edge on the other lateral side of the blade trailing edge, and the blade trailing edge projects through the opening defined by the slit in the sleeve, and tensioning bands on the sleeve adjacent the first and second slit edges of the slit for tensioning the sleeve in the longitudinal direction.

2. The device according to claim 1 wherein the tensioning bands comprise bands of material secured to a material of the sleeve.

3. The device according to claim 1 wherein the tensioning bands comprise an elastic material.

4. The device according to claim 3 wherein the tensioning bands comprise an elastomer.

5. The device according to claim 1 wherein the tensioning bands comprise a high strength woven material.

6. The device according to claim 1 wherein one or more additional tensioning bands are provided extending laterally across the sleeve.

7. The device according to claim 6 wherein the additional tensioning bands comprise an elastomer.

8. The device according to claim 1 wherein tensioning lines are attached to ends of the tensioning bands at the sleeve open end, by which longitudinal tension is configured to be applied to the sleeve.

9. The device according to claim 8 further comprising a rigid strip or hoop which in use extends around the blade at a position between the sleeve and a blade root to which the tensioning lines are secured.

10. The device according to claim 9 further comprising one or more lines in use extending from the strip or hoop to a point on the blade root or a rotor hub.

11. The device according to claim 1 wherein the flexible sleeve is formed of a material which provides a high surface roughness when fitted on the blade.

12. The device according to claim 11 wherein the flexible sleeve is formed of a net-like material.

13. The device according to claim 1 wherein the flexible sleeve is formed of a fabric material with a plurality of flow-disrupting members protruding from and secured to the fabric material and distributed spaced over the sleeve.

14. The wind turbine blade having a device according to claim 1 fitted thereon.

15. A method of fitting a device according to claim 1 on a wind turbine blade comprising the steps of: positioning the sleeve of the device over the blade with the tip end fitting over the blade tip and the sleeve extending over and along the blade with the slit arranged at the blade trailing edge, and applying tension to the tensioning bands so that the sleeve is tightly held against a blade surface at a region of the trailing edge.

16. The method according to claim 15 wherein the sleeve of the device is provided with lateral tensioning bands, the method further comprising the step of, as the sleeve is longitudinally tensioned, allowing the lateral bands to become tensioned, thereby holding the sleeve tightly against the blade surface.

* * * * *